United States Patent [19]

Kisrow

[11] 4,070,582

[45] Jan. 24, 1978

[54] X-RAY FILM HOLDER USING CAPACITIVE SENSING FOR DETERMINING FILM SIZE

[75] Inventor: Leverne Kisrow, Ramsey, Minn.

[73] Assignee: Minnesota Mining and Manufacturing Company, St. Paul, Minn.

[21] Appl. No.: 720,226

[22] Filed: Sept. 3, 1976

[51] Int. Cl.² ............................................. G03B 41/16
[52] U.S. Cl. ................................ 250/475; 250/416 R; 250/480
[58] Field of Search ............... 250/475, 480, 481, 482, 250/416 R

[56] References Cited

U.S. PATENT DOCUMENTS

3,846,635  11/1974  Shaffer ................................ 250/480

*Primary Examiner*—Craig E. Church
*Attorney, Agent, or Firm*—Cruzan Alexander; Donald M. Sell; Robert L. Marben

[57] ABSTRACT

An X-ray film holder wherein a number of capacitive sensors are positioned and connect with circuitry for determining the presence of film in the holder and, when film is present, determining which one of several predetermined sizes have been placed in the film holder, plus whether the film is properly centered with such information used to provide control signals including a signal with a characteristic dependent on the width dimension of the film and a signal with a characteristic dependent on the length dimension. In addition, the circuitry provides a visible indication of the length dimension of the film placed in the holder for use in positioning the holder with respect to the X-ray source.

10 Claims, 8 Drawing Figures

X-RAY FILM HOLDER USING CAPACITIVE SENSING FOR DETERMINING FILM SIZE

BACKGROUND OF THE INVENTION

1. Field of the Invention

The present invention relates generally to structure and circuitry for sensing the presence of an insulative sheet material wherein the structure includes capacitive sensors and, in particular, relates to the use of such structure in an X-ray film holder wherein a number of capacitive sensors are used with associated circuitry for determining the presence of film in the holder and, when film is present, determining which one of several predetermined sizes of films have been placed in the film holder, plus whether the film is properly centered with such information used to provide control signals including a signal with a characteristic dependent on the width dimension of the film and a signal with a characteristic dependent on the length dimension.

2. Brief Description of the Prior Art

X-raying a patient involves the selection of film from a number of predetermined film sizes and, with some equipment, requires knowledge of the orientation of such film relative to the position of the patient. In order that a patient not be exposed to unnecessary radiation, the shutters of the X-ray machine collimator are adjusted according to the size and orientation of film being used. Since the operator might fail to adjust the shutters or make the wrong adjustment, a need was seen for an arrangement wherein the shutter would be adjusted automatically. In the case of X-ray equipment using a different X-ray film cassette or holder for each film size, wherein the film cassette is centered in a tray that is slideable into and out of a carriage positioned below the panel of the X-ray table on which a patient lies, a system was devised wherein the sides of the cassette are electro-mechanically sensed to determine the film size. The mechanical movement to accomplish the sensing is linked to a potentiometer to provide a voltage level indicative of the degree of mechanical movement and, therefore, indicative of the film size and its orientation. The shutters of the X-ray machine collimator are also operatively connected to potentiometers to provide a voltage level indicative of the shutter positions. The shutters in this system are automatically moved in accordance with the voltage difference that is presented between the voltages provided by the mechanical sensing of the film cassette and the voltages provided by the position of the shutters. The voltage difference is reduced to zero by the proper direction and amount of movement of the shutters causing the shutters to be set to the correct position for the film cassette being used.

An X-ray film holder of the type shown in U.S. Pat. No. 3,846,635 to Shaffer made it possible to efficiently use a new X-ray film having a low sensitivity to a visible portion of the spectrum of light. Using this film, it is possible to use a single film holder. The holder can remain in the X-ray table tray and the film can be loaded in the holder without removing the holder from the tray. It can also be similarly removed from the holder after an exposure and immediately processed to determine whether a re-take is needed before the patient is released. Since the size of the holder does not change with film size, it is not possible to mechanically sense the size of the film holder to obtain an indication of the size of the film used and an indication of the orientation of the film relative to the position of the patient for use in the system for automatically adjusting the shutters of the collimator.

The film holder of the type shown in U.S. Pat. No. 3,846,635 to Shaffer includes a shallow open-topped receptacle that comprises a rigid bottom plate and upwardly extending sidewalls which comprise at least at their upper extremity a resilient gasket member that extends continuously around the open top of the receptacle and whose upper edge defines a single plane; a top plate attached to the receptacle in position to rest against the upper edge of the gasket member to close the receptacle and adapted to be drawn toward the bottom plate a uniform amount over the whole area enclosed by the gasket member; a pressure plate supported above and parallel to the bottom plate; and an exhaust port located in the receptacle or top plate for attachment to a vacuum source, whereby a vacuum may be formed within the film holder to draw the top plate toward the bottom plate and tightly sandwich film between the top plate and pressure plate.

BRIEF SUMMARY OF THE INVENTION

This invention includes a basic sensing structure and circuitry for sensing the presence of a sheet of insulating material. It includes a reference capacitor and a sensing capacitor, each having the same structure in the absence of a sheet of insulating material presented to the sensing capacitor, the circuitry including a differential amplifier having two inputs, one input connected to the reference capacitor with the other input connected to the sensing capacitor and an alternating signal source connected to the reference and sensing capacitors. The sensing capacitor is arranged for receiving an insulating sheet and when one is so received, the magnitude of the alternating signal passed by the sensing capacitor differs from that passed by the reference capacitor causing the differential amplifier to produce an output signal. Such basic sensing structure and circuitry are useful, for example, for sensing film in a film holder for developing control signals for use in the operation of X-ray equipment.

The invention is embodied in a film holder of the type described above to provide a film holder which includes a plurality of capacitors comprising an electrically conductive sheet disposed for movement with the top plate and a plurality of spaced apart electrically conductive discs positioned adjacent the pressure plate and electrically insulated from the pressure plate. Such a film holder is usable with electrical circuitry connected to the electrically conductive discs and the electrically conductive sheet for providing an alternating signal to the capacitors and responsive to the alternating signal passed by each of the capacitors as determined by whether film is present between the electrically conductive sheet and the disc of each capacitor. The plurality of capacitances are positioned dependent on the possible sizes of film to be used and are connected to a plurality of sensing circuits, the outputs of which are operatively connected with logic circuitry having a plurality of outputs. The logic circuitry, dependent on the signals provided by the output of the plurality of sensing circuits, provides signals at the output of the logic circuitry indicative of the size (length and width) of the film placed in the film holder, provided the film has been properly centered in the film holder, and also provides a signal indicating when the film has been properly centered. A circuit portion is provided for converting the length and width indicating signals to a voltage signal for the film length and a voltage signal for the film width. The magnitude of the voltage signals are indicative of the film size. Such voltage signals are usable as position reference voltages for positioning the shutters of the collimator for the X-ray machine in which the film holder is placed.

The film holder includes a portion which, when the holder is placed in the X-ray table tray, extends lengthwise along the X-ray table. A light source for each possible length of film used with the film holder is positioned in such portion, which, for example, may be a handle for the holder. Circuitry for each light source is provided which, for energization of a light source, requires an output signal from the logic circuitry indicative of the film length for the light source, plus a signal provided by the logic indicating the film has been properly centered. A length indication is provided for and associated with each light source and is positioned opposite the lengthwise center for the film positioned in the film holder corresponding to the light source. A narrow beam of light is provided by the X-ray head of the X-ray equipment with which the film holder is used and is directed toward and is intercepted by the portion containing the light sources. With an energized light source provided in accordance with film size being used, the X-ray table tray in which the film holder is carried is moved lengthwise of the table by the operator to position the length indication for the energized light source so it is aligned with the light beam from the X-ray head. The film in the film holder is then properly positioned lengthwise of the X-ray table with respect to the X-ray source.

BRIEF DESCRIPTION OF THE DRAWINGS

The invention will be better understood by reference to the following detailed description when considered in connection with the accompanying drawings in which like numerals designate like parts throughout the figures and wherein:

FIG. 8 shows how FIGS. 5-7 are positioned to provide a complete schematic of the circuitry of FIG. 4.

DETAILED DESCRIPTION

Figure 1:
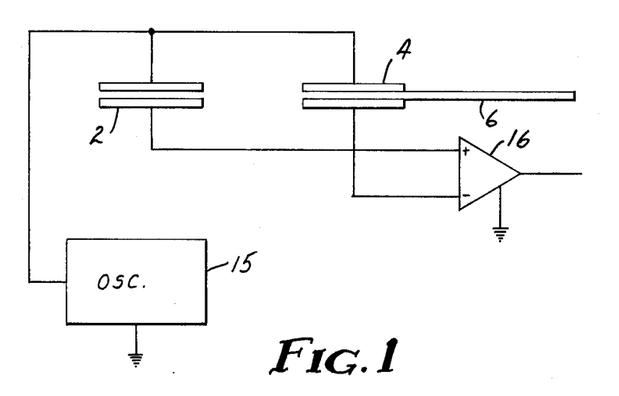
FIG. 1 is a schematic of a circuit that is basic to this invention.

FIG. 1 is a schematic of the basic circuitry of the invention. This circuitry includes a reference capacitor 2 and a sensing capacitor 4. The capacitors are designed to present the same capacitance, except that capacitor 4 is a sensing capacitor used to receive material between its plates which alters its capacitance. In the case of FIG. 1, the sheet material 6, which is insulating in nature, is shown positioned between the two plates of capacitor 4. An oscillator 15 is connected to each of the capacitors 2 and 4 to impress an alternating signal across each of the capacitors. A differential amplifier 16 has one input connected to capacitor 2 and the other input connected to capacitor 4. In the event an item to be sensed is not presented to capacitor 4, the level of the alternating signal passed by capacitor 4 will be the same as the level of the alternating signal passed by capacitor 2 causing the output of the differential amplifier 16 to be zero. When an item to be sensed, such as the sheet material 6, is positioned between the plates of capacitor 4, the alternating signals passed by capacitors 2 and 4 will differ causing the differential amplifier 16 to provide a signal at its output.

Figure 2:
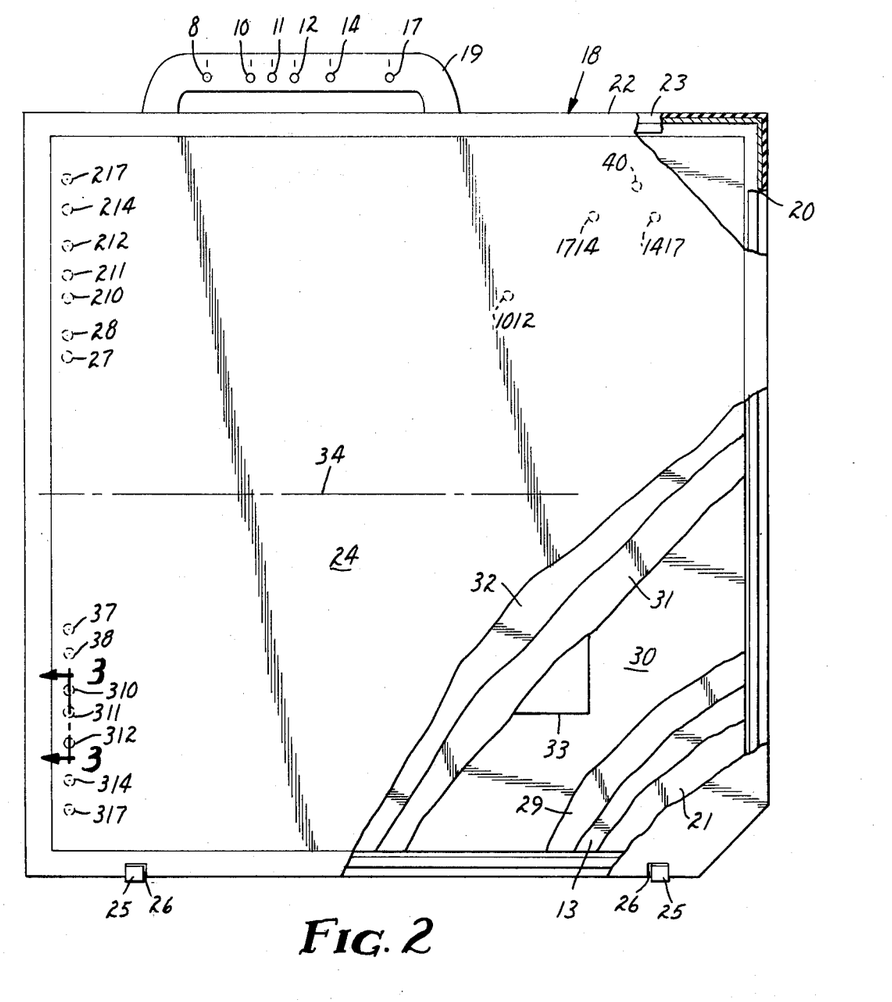
FIG. 2 is a plan view, with parts broken away, of a film holder of the invention in which a film has been positioned.

The circuit of FIG. 1 is used in connection with the film holder 18 shown in FIG. 2. Except for modifications that will be described for providing capacitive structures and circuitry for use in sensing film placed in the holder and the addition of the handle 19 in which a number of indicating light sources are mounted, the film holder is substantially the same as that described in U.S. Pat. No. 3,846,635 to Shaffer. The film holder 18 includes a shallow open-topped receptacle 20 that comprises a bottom plate 21, a short upwardly-extending sidewall that comprises a base sidewall 22, and a resilient gasket 23 mounted over the base sidewall. A top plate 24, which may be rigid or of an elastically bendable material, is attached to the edge of the receptacle 20 opposite the handle 19 by hinges 25 that extend through apertures 26 in the top plate. A pressure plate 29 is supported above and parallel to the bottom plate. A circuit board 13 containing the circuitry of FIGS. 5, 6 and 7 is mounted between the pressure plate and the bottom plate. Two radiation-intensifying screens 30 and 31 are included, screen 30 is positioned above and adjacent to the pressure plate 29 while screen 31 is positioned adjacent to the thin, flexible conductive sheet or conductive film 32 carried by the top plate 24. The thin conductive sheet 32 is not used in the film holder structure shown in the patent to Shaffer and is included in the structure shown in FIG. 2 to provide one of the plates for each of the capacitors that are used in the structure of FIG. 2.

An exhaust means (not shown) similar to that described in connection with the structure shown in the patent to Shaffer is provided to exhaust the air from the film holder after a film has been placed in the film holder causing the top plate 24 to be drawn down against the resilient gasket 23 and urge the top plate toward the pressure plate so that full and intimate contact is developed between the intensifying screens 30 and 31 and a sheet of film 33 placed in the film holder between the intensifying screens. The film holder of FIG. 2 is shown with a film 33 in position.

Commercially available film sizes usable with the film holder of FIG. 2 are as follows:

| | |
|---|---|
| 7 × 17 (inches) | 18 × 43 (centimeters) |
| 8 × 10 | 20 × 25 |
| 10 × 12 | 25 × 30 |
| 11 × 14 | 28 × 35 |
| 14 × 14 | 35 × 35 |
| 14 × 17 | 35 × 43 |

When placed in the film holder, the above films are positioned with the smaller dimension along the left edge against the gasket 23 and are positioned centrally between the upper and lower edges of the holder as viewed in FIG. 2. In addition, the 8 × 10, 10 × 12, 11 × 14, and 14 × 17 size films are also used with the longer side positioned along the left edge of the film holder. Accordingly, there are ten possible film configurations involved in the use of the film holder requiring detection of seven possible dimensions in the direction perpendicular to the handle 19 which, for purposes of this invention description will be referred to as width dimensions, and six possible dimensions in the direction parallel to the handle 19, will be referred to as length dimensions.

The dotted circles along the upper left edge portion of the film holder indicate the location of seven capacitor structures 27, 28, 210, 211, 212, 214 and 217. Proper placement of the film requires that it be centered with respect to the broken reference line 34 shown in FIG. 2 that is drawn perpendicular with respect to the left edge of the film holder and about midway between the upper and lower edges of the film holder. Markings (not shown), which correspond very closely to the centers of circles 27, 28, 210, 211, 212, and 214, are provided on the screen 30 to guide the operator in the placement of film in the holder. Six of the seven capacitor structures are positioned with respect to the line 34 so the edge portion of properly positioned films having width dimensions of 7, 8, 10, 11, 12 and 14 will be received about halfway in capacitors 27, 28, 210, 211, 212 and 214, respectively. Capacitor 217 is only used as a reference capacitor with capacitor 214. Film having a width dimension of 17 will fill the capacitor 217. Centering of film having a width dimension of 17 does not present a problem as the width dimension of the holder is only slightly greater than 17.

Whether a particular film having a width dimension of 7, 8, 10, 11, 12, or 14 has, in fact, been properly centered with respect to the center line 34 is determined by the capacitor structures indicated by the dotted circles 37, 38, 310, 311, 312, 314 and 317 shown below line 34 and along the left edge of the film holder. These capacitive structures are also positioned with respect to the line 34 so the edge portion of properly positioned films having width dimensions 7, 8, 10, 11, 12 and 14 will be received about halfway in capacitors 37, 38, 310, 311, 312 and 314, respectively. Capacitor 317 is only used as a reference capacitor with capacitor 314. Film having a width dimension of 17 will fill the capacitor 317. Four other capacitor structures 1012, 1714, 1417 and 40 are provided in connection with the detection of the sizes of one or more of the films having width versus lengths of 10 × 12; 14 × 14; 14 × 17 and 17 × 14. These capacitors, as indicated by their reference numbers, are positioned to sense or not sense the presence of film for the film sizes as indicated below with the pairs of capacitors 40, 1417, and 1417, 1714 fairly close together.

| FILM SIZE (W×L) | SENSING CAPACITORS (SENSING FILM) | REFERENCE CAPACITORS (NOT SENSING FILM) |
| --- | --- | --- |
| 10 × 12 | 1012 | 1714 |
| 14 × 14 | 1714 | 1417 |
| 14 × 17 | 1417 | 40 |
| 17 × 14 | 1714 | 1417 |

Figure 3:
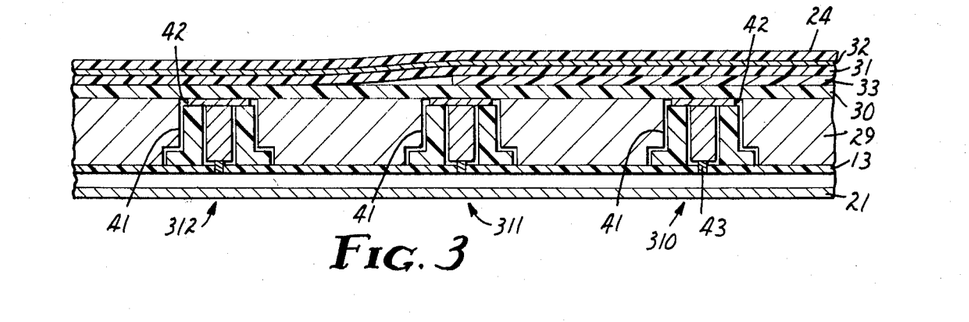
FIG. 3 is a partial section view of the film holder of FIG. 2, taken generally along the lines 3—3 in FIG. 2.

FIG. 3 is a partial section view of the film holder of FIG. 2, taken generally along the lines 3—3 in FIG. 2 to provide a showing representative of the structure for the capacitors that have been mentioned. It represents a section view with a vacuum applied to the film holder and with a properly positioned film present having a width dimension of 11. Considering the right edge of FIG. 3 and beginning with the top layer, the various layers include the top plate 24, conductive sheet 32, intensifying screen 31, film 33, intensifying screen 30, pressure plate 29, circuit board 13, and the bottom plate 21. The structures for all of the capacitors, in the absence of film presented to the holder, are designed to present the same capacitance. It is convenient, therefore, to make them all identical to those shown in FIG. 3. The positions for the various capacitor structures are established by a hole 41 provided in the pressure plate 29 for each capacitor. The holes are enlarged adjacent the circuit board 13. The capacitor structure 310 will be described and is representative of a capacitor that is provided when film is presented to it. Centered in the hole 41 and of a diameter slightly smaller than the hole 41 is an electrically conductive disc 42, which provides one plate of the capacitor and is preferably adhesively secured to the intensifying screen 30. In one actual embodiment, discs 0.25 inches (0.635 cm.) in diameter were used with the holes 41 being 0.375 inches (0.953 cm.) in diameter. The metal sheet 32 provides the other plate of the capacitor and together with the intensifying screen 31, the film 33, the intensifying screen 30 and the metal disc 42 provides the basic structure for the capacitor structure 310. Connection of the metal disc 42 to the circuitry (not shown in FIG. 3) at the circuit board 13 is required and may, for example, be completed by a conductive member 44, such as conductive rubber, metal spring, or the like, between the disc 42 and a conductive portion 43 at the circuit board 13. The conductive member 44 is insulated from the pressure plate 29 by an insulator 45 shaped for retention in the hole 41 and provided with a central opening for receiving the conductive member 44. The capacitor structure 311 is identical to that described for capacitor structure 310 in that it also receives the film 33. Capacitor structure 312 is representative of the capacitive structure provided when film is not presented to it and differs from that of capacitor structures 310 and 311 only in respect to the distance between the metal sheet 32 and the disc 42, plus the absence of the film 33 between the intensifying screens 30 and 31.

Indicating light sources identified by reference numerals, 8, 10, 11, 12, 14 and 17 are provided in the handle 19 (FIG. 2). The reference numerals correspond to a film having a like length dimension. Each light source is positioned opposite the lengthwise center of the film length dimension it corresponds to. If desirable, a mark can be provided in the handle 19 opposite each of the indicating light sources by moving the tray in which the holder is placed, the pertinent light source or mark can be readily aligned with a light beam provided by the X-ray head of the equipment with which the film holder is used to properly position the film lengthwise of the X-ray table with respect to the X-ray sources.

Figure 4:
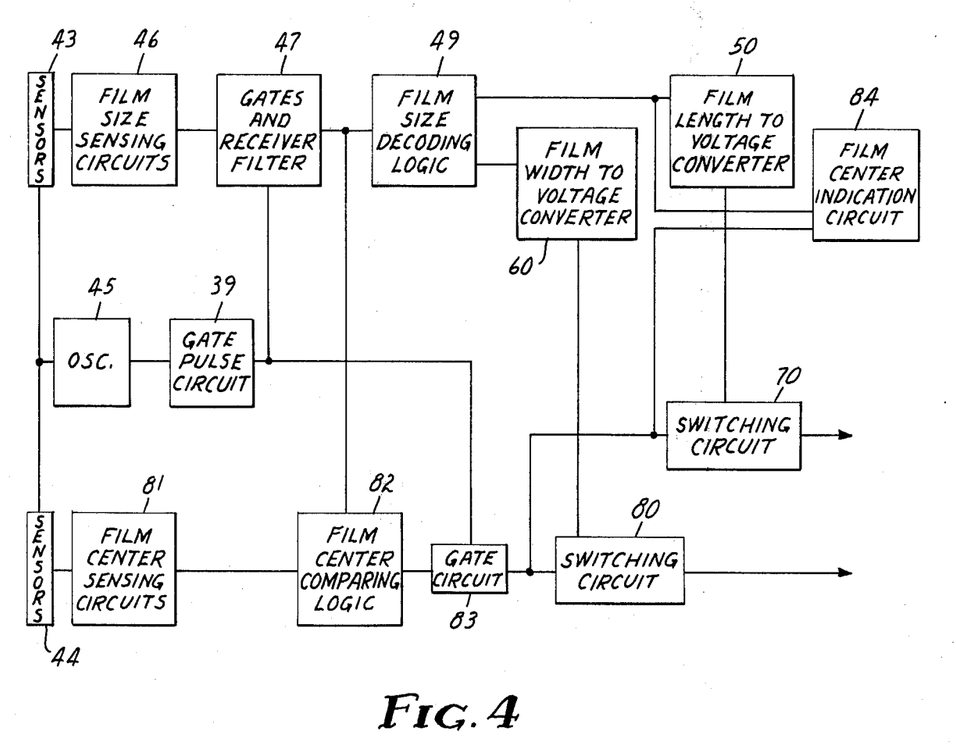
FIG. 4 is a block diagram of circuitry of the invention.

FIG. 4 is a block diagram of circuitry connected to the various capacitor structures that have been described. The block 43 represents the capacitive structures which appear in the upper half of the film holder 18 (FIG. 2). These capacitors are utilized as sensors to determine the size of the film that is present in the holder. Block 44 represents the capacitive structures contained in the lower half of the film holder 18, which serve as sensors for use in determining whether the film placed in the holder is centered with respect to the reference line 34 shown in FIG. 2. An oscillator 45 is provided to apply an alternating signal to all of the capacitors. An oscillator that provides a 8 to 9 volt (peak to peak) 400 HZ sinusoidal signal is suitable. A film size sensing circuit 46 receives the outputs from the various capacitors provided at 43. The film size sensing circuit 46 has a number of outputs, each of which connect with a separate gate and rectifier and filter circuit which are represented by the block 47. A gate pulse circuit 39 is provided which, in response to each positive half of the signal from the oscillator 45, will produce a positive gating pulse to the gate circuits contained in the block 47, which also has rectifier-filters for each gate circuit. The outputs at the various rectifier-filters at 46 are connected to the film size decoding logic 49. The logic 49 has an output for each possible length dimension and an output for each possible width dimension. The length dimension outputs are applied to a film length to voltage converter 50 which provides a different voltage for each possible length dimension output while the width dimension outputs are applied to film width to voltage converter 60 which provides a different voltage for each possible width dimension output. The voltage output from the film length to voltage converter 50 is applied to a switching circuit 70 while the voltage output of the film width voltage converter 60 is applied to a switching circuit 80.

The length dimension voltage and the width dimension voltage are not applied to or passed by the switching circuits 70 and 80 unless it is known that the film in the holder is properly centered. The capacitors represented by the block 44 are connected to a film center sensing circuit 81 which provides information for determining at which capacitor structure the lower edge of the film in the film holder, as viewed in FIG. 2, is positioned. Such information is presented at a number of possible outputs provided by the circuit 81 which are connected to a film center comparing logic 82. The film center comparing logic 82 is also connected to a number of the outputs provided at the gate and rectifying filter circuits at 47 to obtain information identifying the particular capacitor structure that is detecting the upper edge of the film in the film holder. If there is proper coincidence between the various inputs to the film center comparing logic 82, the film is properly centered causing the logic 82 to provide a signal to a gate 83 which signal is gated out of the gate 83 by gate pulses provided from the gate pulse circuit 39. The signal from gate 83 is applied to switching circuit 70 and switching circuit 80 allowing the switching circuit 70 to pass the length dimension voltage provided by the film length to voltage converter 50 and allowing the switching circuit 80 to pass the width dimension voltage provided by the film width to voltage converter 60.

The circuitry indicated by block 84 includes a film center indication circuit for each possible film length dimension, each indication circuit having an indicating light source which is located in the handle 19 of the film holder. Such circuits receive the length dimension information from the film size decoding logic 49 and are further controlled by the gate signal from gate 83. The indicating light source in handle 19 that corresponds to the length dimension detected for a film will be energized provided the film has been properly centered in the film holder.

Figure 5:
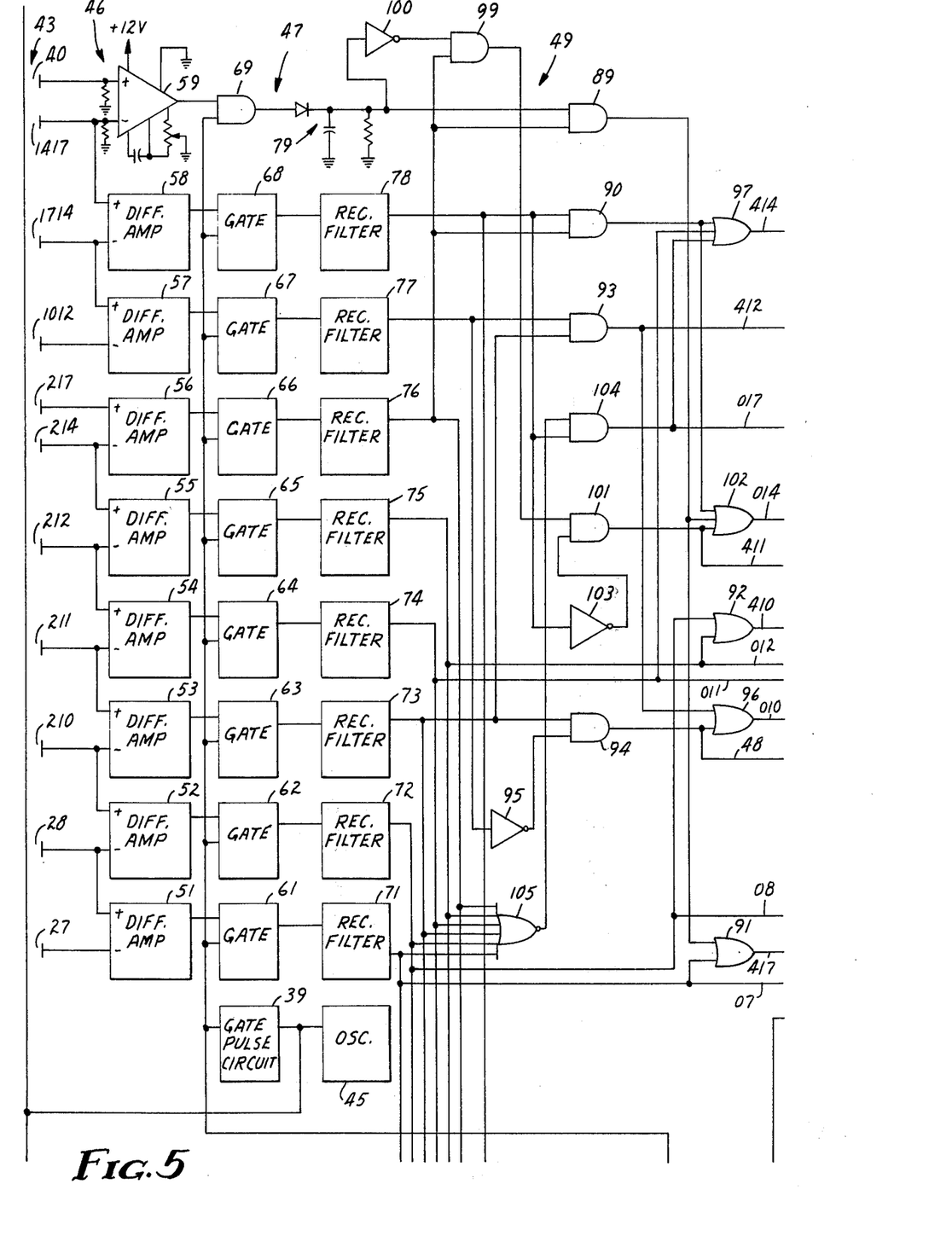
FIG. 5 is a schematic of a portion of the circuitry shown in FIG. 4.
Figure 6:
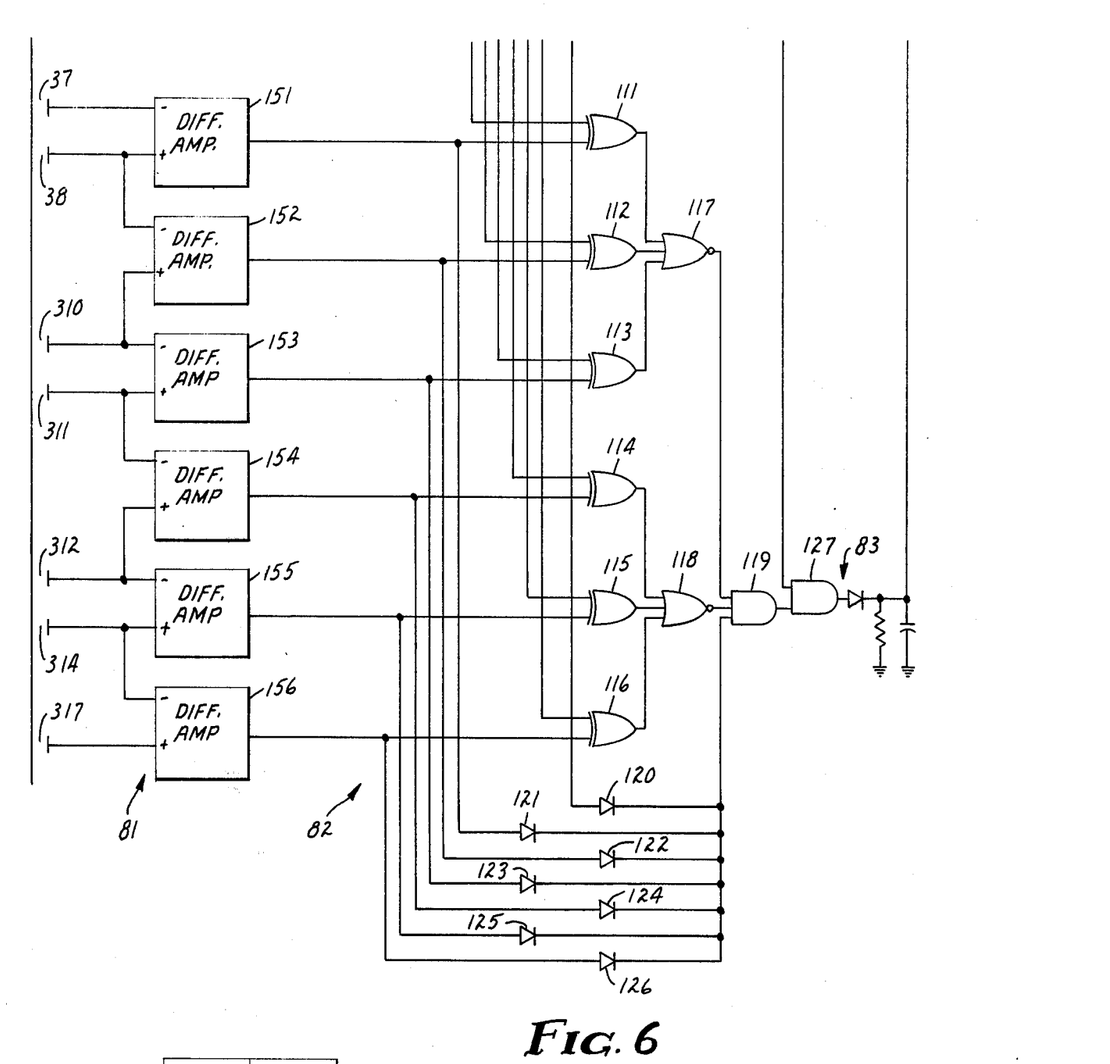
FIG. 6 is a schematic of a portion of the circuitry shown in FIG. 4.
Figure 7:
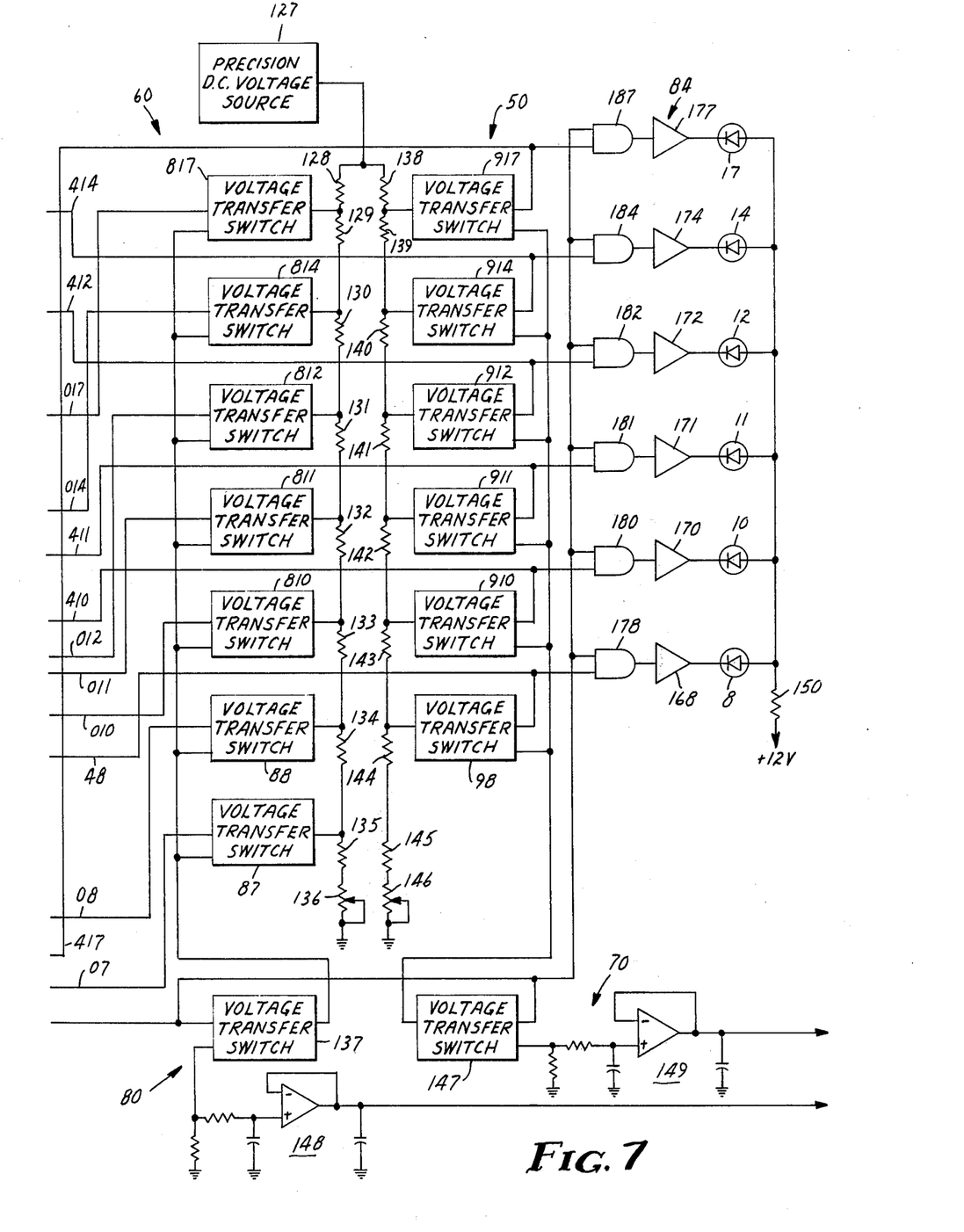
FIG. 7 is a schematic of a portion of the circuitry shown in FIG. 4.
Figure 8:
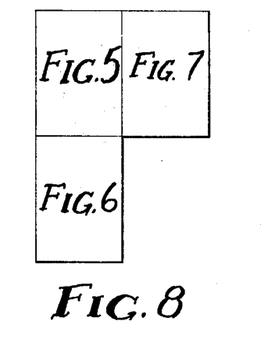

The arrangement of FIGS. 5-7 in accordance with FIG. 8 provides a schematic of the circuitry of FIG. 4.

The film size sensing circuits 46 include differential amplifiers 51-59, inclusive. These may, for example, be differential amplifiers available from the Radio Corporation of America under the type designation 3130. The differential amplifiers are connected as shown for the differential amplifier 59 with a loading resistor connected to each input of the amplifier. Those capacitors above the broken line 34, as shown in FIG. 2, are connected to the differential amplifiers as shown in FIG. 5 and, as set forth below, function as reference capacitors or as sensor capacitors for the differential amplifiers. The differential amplifiers, as listed below, provide an output when a film of the width and length dimensions, as indicated, have been properly positioned in the film holder. When so positioned, the applicable reference capacitor will not have film presented to it, while the applicable sensor capacitor will receive film presented to it reducing its capacitance and, therefore, the magnitude of the signal it passes. In all other cases for the various usable film sizes, the output of the amplifier is zero because film is either present or absent in both the sensor and reference capacitor. The reference capacitors connect to the non-inverting input of the operational amplifier.

| DIFFERENTIAL AMPLIFIER | SENSOR CAPACITOR | REFERENCE CAPACITOR | WIDTH DIMENSION | LENGTH DIMENSION |
|---|---|---|---|---|
| 51 | 27 | 28 | 7 | 17 |
| 52 | 28 | 210 | 8 | 10 |
| 53 | 210 | 211 | 10 | 8 or 12 |
| 54 | 211 | 212 | 11 | 14 |
| 55 | 212 | 214 | 12 | 10 |
| 56 | 214 | 217 | 14 | 11, 14 or 17 |
| 57 | 1012 | 1714 | 10 | 12 |
|  |  |  | 11 | 14 |
| 58 | 1714 | 1417 | 14 or 17 | 14 |
| 59 | 1417 | 40 | 14 | 17 |

A separate AND gate is provided for each differential amplifier. AND gates 61-69 connect to the output of differential amplifiers 51-59, respectively. A rectifier-filter circuit is provided for each of the AND gates. Rectifier-filter circuits 71-79 connect to the output of AND gates 61-69, respectively, and as shown for the rectifier-filter circuit 79, each includes a diode, capacitor and resistor. For example, a capacitor of 0.1 microfarad and a 470,000 ohm resistor will provide a continuous high signal for each signal gated to a rectifier-filter circuit.

Details are not given regarding the oscillator 45 and the gate pulse circuit 39. As indicated, an oscillator providing a 400 HZ signal is suitable. The gate pulse circuit, as indicated, can be any circuit which will provide a positive gating pulse for each positive half of the oscillator signal. Circuits of this type are well known and, therefore, need not be described in any detail. The output of the gate pulse circuit 39 is connected so as to provide the second of the two inputs for AND gates 61-69.

The film size decoding logic 49 has output conductors 07, 08, 010, 011, 014 and 017 corresponding to film width dimensions 7, 8, 10, 11, 12, 14 and 17, respectively, and output conductors 48, 410, 411, 412, 414 and 417 corresponding to film length dimensions 8, 10, 11, 12, 14 and 17. A high signal is presented on only the appropriate width dimension output conductor and on only the appropriate length dimension output conductors for each possible film size when properly centered in the film holder. The logic 49 can be best described and understood by considering each film size that can be used with the circuitry.

7 × 17 This film size when properly positioned causes a high signal to be presented at the output of rectifier-filter 71, since the upper edge portion of the film will be present at the capacitor 27 to cause a lesser signal to be presented to the differential amplifier 51 than is presented by the capacitor 28 for amplifier 51 at which no film is present. All of the other rectifier-filters connected to the various differential amplifiers associated with logic 49 will have low outputs. The output conductor 07 for logic 49 is connected directly to rectifier-filter 71 so a high signal on output 07 will indicate a width of 7 for the film presented to the holder. The output of rectifier-filter 71 is also connected to an OR gate 91, the output of which is connected to the output conductor 417 of logic 49. A high output is presented to output 417 from OR gate 91 when a 7 × 17 film is present and is used to indicate that the film length is 17.

8 × 10 This film size when properly positioned causes a high signal to be present at the output of rectifier-filter 72, since the upper edge portion of the film will be present at the capacitor 28 with no film present at the capacitor 210 for the differential amplifier 52. The output conductor 08 for logic 49 is connected directly to rectifier-filter 72 so a high signal on output 08 will indicate a width of 8 for the film presented to the holder. The output of rectifier-filter 72 is also connected to an OR gate 92, the output of which is connected to the output conductor 410 of logic 49. A high output is, therefore, present on output 410 from OR gate 42 when a 8 × 10 film is present and is used to indicate a length of 10 for the film then present in the holder.

10 × 12 This film size when properly positioned causes a high signal to be present at the output of rectifier-filter 73, since the upper edge portion will be present at the capacitor 210 while no film is present at the capacitor 211 for the differential amplifier 53. The output from rectifier-filter 73 is connected to AND gates 93 and 94. The rectifier-filter 77 associated with the differential amplifier 57 also has a high output since capacitor 1012 receives film while capacitor 1714 does not. This output is connected to the remaining input of AND gate 93 and the input to an inverter 95, the output of which connects to the remaining input of AND gate 94. Of the two AND gates 93 and 94, only AND gate 93 receives a high signal at each of its inputs to provide a high output which appears on the output conductor 412 for logic 49 serving to indicate a length of 12 for the film presented to the holder. The high output from AND gate 93 is also applied to an output for OR gate 96 causing it to have a high output which appears on the output conductor 010 for logic 49 serving to indicate a width of 10 for the film then presented to the holder. 11 × 14 This film size when properly positioned causes a high signal to be present at the output of rectifier-filter 74, since the upper edge portion of the film will be present at the capacitor 211 while no film is present at the capacitor 212 for differential amplifier 54. The output of rectifier-filter 74 is applied to the output conductor 011 of logic 49 indicating a width of 11 for the film then presented to the holder. In addition, the output of rectifier-filter 74 is applied to an input of an OR gate 97 causing a high signal to be present at its output which is connected to the output conductor 414 of logic 49, serving to indicate a length of 14 for the film then presented to the holder. The rectifier-filter 77 associated with the differential amplifier 57 also has a high output since capacitor 1012 receives film while capacitor 1714 does not. The rectifier-filter 77 is connected to AND gate 93 and to AND gate 94 via inverter 95. The outputs for AND gates 93 and 94 remain low and, therefore, do not cause a high signal to be presented on any other of the output conductors for logic 49.

- × 14 This film size when properly positioned causes a high signal to be presented at the output of rectifier-filter 76, since the upper edge portion will be present at the capacitor 214 while no film is presented to the capacitor 217 for differential amplifier 56. The output from rectifier-filter 76 is applied to one input of AND gate 90, one input of AND gate 89 and one input of AND gate 99. An inverter 100 is used to connect the output from the rectifier-filter 79 to the remaining input of AND gate 99. The signal at the output of the rectifier-filter 79 will be low since no film is presented to either of the capacitors 40 and 1417 associated with differential amplifier 59 causing a high signal to be presented by the inverter 100 to the AND gate 99. With high signals presented to both inputs of the AND gate 99, a high signal is presented at the output of AND gate 99 which is applied to one input of AND gate 101. The other input of gate 101 is low so its output is low. Referring to differential amplifier 58, its sensing capacitor 1714 will be receiving film while its reference capacitor 1417 does not receive film causing the differential amplifier to have an output which will appear as the high signal at the output of rectifier-filter 78 which is connected to the other input of AND gate 90 causing the output of the AND gate 90 to be high. The AND gate 90 is connected to OR gate 97 and also to OR gate 102. The high signal applied to OR gate 97 from AND gate 90 causes a high signal to be present at the output of OR gate 97 which is connected to the output conductor 414. The high signal on conductor 414 is used to indicate a length of 14 for the film presented to the holder. Since one input of the OR gate 102 receives a high signal from AND gate 90, the output of the OR gate 102 which is connected to the output conductor 014 will be high serving to indicate a width dimension of 14 for the film presented to the holder. 14 × 17 This film size, as in the case of a film 14 × 14, causes a high signal to be present at the output of the rectifier-filter 76 which is applied to an input at each of the AND gates 89, 90 and 99. This size film also presents film to the sensing capacitor 1417 with no film present at the capacitor 40 causing the differential amplifier 59 to have an output which will result in a high signal at the output side of rectifier-filter 79. This causes a low input to be presented by the inverter 100 at the other input of the AND gate 99 so the output of And gate 99 will be low. The output of the AND gate 90 is also low since the input received from rectifier-filter 78 is low. However, the output of AND gate 89 is high since it receives a high signal from rectifier-filters 76 and 79 so both of its inputs are high. The output of AND gate 89 is connected to OR gate 102 and to OR gate 9. This causes a high signal to be present on the output conductor 014, which is connected to the output of OR gate 102 indicating the film width to be 14 and causes a high signal to be present on the output conductor 417 which is connected to the output of OR gate 91 indicating the film length to be 17. 10 × 8 When this film size is properly positioned in the film holder, a high signal is presented only at the output of rectifier-filter 73, since an edge portion of the film is received in the capacitor 210, while no film is received in the capacitor 211. The high signal from rectifier-filter 73 is applied to one input of AND gate 94. The low signal present at the output of rectifier-filter 77 is applied to the inverter 95, which has its output connected to the other input for AND gate 94 to provide a high signal to the other input to AND gate 94. With both inputs to AND gate 94 high, its output is high and applied to the output conductor 48 for logic 49 to indicate a length of 8 for the film present in the film holder. The output of AND gate 94 is also connected to an input for OR gate 96, which has its output connected to the output conductor 010 for logic 49. The output of OR gate 96 is, therefore, high serving to indicate a width of 10 on output conductor 010 for the film presented to the film holder. 12 × 10 When this film size is properly positioned in the film holder, a high signal is presented only at the output of rectifier-filter 75. In this case, the edge portion received in capacitor 212, while no film is received in capacitor 214 causing the differential amplifier 55 to provide an output signal. The output of rectifier-filter 75 is connected to the output conductor 012 for logic 49 and to one input of OR gate 92, which has its output connected to the output conductor 410 for logic 49. A high output at the rectifier-filter 75, therefore, results in a high signal at output conductor 410 and output conductor 012, the high output at output conductor 410 indicating a length of 10 for the film and the high at output conductor 012 indicating a width of 12 for the film in the film holder.

14 × 11 When properly positioned in the film holder, this film size causes a high output to be presented only at the output of the rectifier-filter 76, since the edge portion of the film will be received in the capacitor 214 while no film is present in the capacitor 217 causing the differential amplifier 56 to have an output. The output of rectifier-filter 76 is applied to AND gates 89, 90 and 99. The output of AND gates 89 and 90 remain low while the output of AND gate 99 is high since the other input to AND gate 99 receives a high signal from the inverter 100. The high signal from AND gate 99 is applied to one input of AND gate 101. The other input to AND gate 101 is high since it is connected to an inverter 103 which has its input connected to the low output presented by the rectifier-filter 78. A high signal is, therefore, presented at the output of AND gate 101. The output of AND gate 101 is connected to the output conductor 411 of logic 49 and to an input of OR gate 102 which has its output connected to the output conductor 014 of logic 49. A high signal is, therefore, present on output conductor 014 indicating that a film width of 14 has been detected with the high on output conductor 411 indicating a film length of 11 has been detected. 17 × -When properly positioned in the film holder, this film size causes a high signal to be presented only at rectifier-filter 78, since the sensing capacitor 1714 for differential amplifier 58 will be receiving film while its reference capacitor 1417 does not receive film causing the differential amplifier 58 to have an output. This results in a high signal at the output of rectifier-filter 78 which is applied to AND gates 90 and 104 plus inverter 103. The signal at the other input to AND gate 90 is low, since it is connected to the output of rectifier-filter 76 so the output of AND gate 90 is low. The output of inverter 103 will be low. With the output of inverter 103 connected to AND gate 101, the output of AND gate 101 is low. The other input to AND gate 104 is connected to the output of NOR gate 105. A separate input is provided by the NOR gate 105 for each of the rectifier-filters 71-76. Since all of the rectifier-filters 71-76 have a low output, the output of NOR gate 105 will be high, which with the high from rectifier-filter 78, causes the output of AND gate 104 to be high. The output of AND gate 104 is connected to the output conductor 017 of logic 49 and to an input of OR gate 97, which in turn has its output connected to the output conductor 414 of logic 49. The high output presented at the AND gate 104, therefore, results in a high signal on output conductor 017 indicating a width of 17 for the film present in the film holder and also causes a high signal to be present at the output of OR gate 97 to provide a high signal on the output conductor 414 to indicate a film length of 14.

The film center circuit 81 includes differential amplifiers 151-156, inclusive. Those capacitors indicated in FIG. 2, which are below the broken line 34, are connected to the differential amplifiers of the film center sensing circuit 81 as shown in FIG. 6 and, as set forth below, function as reference capacitors or as sensor capacitors for the differential amplifiers 151-156. The differential amplifiers for the film center sensing circuit are listed below and provide an output when a film of the width dimension, as indicated, has been properly positioned in the film holder. When so positioned, the applicable reference capacitor will not have any film presented to it, while the applicable sensor capacitor will receive film reducing its capacitance and, therefore, the magnitude of the signal it passes to cause the indicated amplifier to have an output. In all of the other cases for the various film width dimensions usable in the film holder, the output of the amplifier is zero because the film is either present or absent in both the sensor and reference capacitor for such amplifier causing the inputs to the amplifier to be the same. The reference capacitors connect to the non-inverting input of the operational amplifier while the sensor capacitors connect to the inverting input of the operational amplifier.

| DIFFERENTIAL AMPLIFIER | SENSOR CAPACITOR | REFERENCE CAPACITOR | WIDTH DIMENSION |
|---|---|---|---|
| 151 | 37 | 38 | 7 |
| 152 | 38 | 310 | 8 |
| 153 | 310 | 311 | 10 |
| 154 | 311 | 312 | 11 |
| 155 | 312 | 314 | 12 |
| 156 | 314 | 317 | 14 |

The film center comparing logic 82 includes EXCLUSIVE OR circuits 111-116 which are connected to differential amplifiers 151-156, respectively. Rectifier-filters 71-76 which are associated with the film size sensing circuits 46 have their outputs connected to a second input at EXCLUSIVE OR circuits 111-116, respectively. An EXCLUSIVE OR circuit produces a high output when one and only one high input signal is presented to it. So long as any film presented to the film holder is centered or if no film is present in the film holder, the output for each of the EXCLUSIVE OR circuits 111-116 will be low. The output from each of the EXCLUSIVE OR circuits 111-116 is applied to NOR logic, which, in this case, is provided by two NOR circuits 117 and 118. The NOR circuit 117 is connected to receive the outputs from EXCLUSIVE OR circuits 111-113, while NOR circuit 118 is connected to receive the outputs from EXCLUSIVE OR circuits 114-116. An AND gate 119 is provided for receiving the output of the NOR circuits 117 and 118. Since the NOR circuits 117 and 118 will provide high inputs to the AND gate 119 when the film is properly centered or when no film is present in the holder, it is necessary that another high input be provided to AND gate 119 to indicate that film is present in the film holder. A high output from AND gate 119 will then indicate that film is present in the holder and such film is properly centered. A high signal indicating that film is present can be obtained from the output of one of the rectifier-filter circuits 71-76 and rectifier-filter 78 or from the output of one of the differential amplifiers 151-156 and rectifier-filter 78. In the case of the circuit shown in FIG. 6, the output of differential amplifiers 151-156 plus the output from rectifier-filter 78 are used with each output connected to the AND gate 119. Since all such outputs are being applied to a single input of AND gate 119, the blocking diodes 120-126 are provided to prevent any high signal that appears at the output for any of the differential amplifiers 151-156 or the rectifier-filter 78 from being fed back to the outputs of the other differential amplifiers or the rectifier-filter connected to AND gate 119.

The gate circuit 83 connected to the film center comparing logic 82 includes an AND gate 127, which has one input connected to the output of AND gate 119 with another input connected to receive a gate pulse from gate pulse circuit 39. The gate circuit 83 also includes a rectifier-filter circuit similar to those connected with gates 61-69. Such rectifier-filter is connected to the output of AND gate 127.

Referring to FIG. 7, a schematic of the film width to voltage converter 60 and the film length to voltage converter 50 described in connection with FIG. 4 is shown. A precision D.C. voltage source 127 is provided for use with each of the circuits 50 and 60. A voltage divider provided by the series connected resistors 128-135 and potentiometer 136 forms a part of the circuit 60. Seven different voltage levels are obtained with the voltage source 127 connected to the voltage divider to provide a different voltage level for each of the possible width dimensions for the film to be used with the holder. A similar voltage divider is provided for circuit 50 by the series connected resistors 138-145 plus the potentiometer 146. This voltage divider is also connected to the voltage source 127 and provides six different voltage levels, one for each possible length dimension for the film sizes to be used in the film holder.

Referring to the circuit 60, a separate one of voltage transfer switches 87, 88, 810, 811, 812, 814 and 817 is connected with each of the seven voltage levels. Voltage transfer switches 87, 88, 810, 811, 814 and 817 are connected to the film width output conductors 07, 08, 010, 011, 012, 014 and 017, respectively, of logic 49. A suitable voltage transfer switch is provided by a bilateral switch sold under the type designation 4066 by the Radio Corporation of America. An output for each of the voltage transfer switches and the output of gate 83 are connected to a similar voltage transfer switch 137 provided as a part of the switching circuit 80. Referring, for example, to the voltage transfer switch 87, the presence of a high signal at the output 07 of logic 49 will cause the voltage at the connection common to resistors 134 and 135 which is connected to the voltage transfer switch 87 to be presented to the voltage transfer switch 137. Voltage transfer switches 88, 810, 811, 812, 814 and 817 are similarly controlled by the outputs 08, 010, 011, 012, 014 and 017, respectively, of the logic 49 to transfer the voltages connected to such transfer switches to voltage transfer switch 137.

The film length to voltage converter circuit 50 is similar to circuit 60 having a voltage transfer switch for each possible length dimension for films used with the film holder. Each of these voltage transfer switches are connected to a different voltage level provided by the voltage divider for circuit 50. Each of the voltage transfer switches has an output which is connected to a voltage transfer switch 147, which forms a part of the switching circuit 70. The voltage transfer switches for circuit 50 are similar to those used for circuit 60. The film length output conductors 48, 410, 411, 412, 414 and 417 of logic 49 are connected to the voltage transfer switches 98, 910, 911, 912, 914 and 917, respectively, of circuit 50 and serve to control the transfer of the voltage presented to a given voltage transfer switch to the voltage transfer switch 147.

Referring to the switching circuits 70 and 80 of FIG. 7, the switching circuit 80 also includes a voltage follower 148 connected to the output of voltage transfer switch 137 while a similar voltage follower 149 is connected to the output of the voltage transfer switch 147 of circuit 70. The voltage provided at the output of the voltage follower 148 and 149 provides the width dimension reference voltage and length dimension reference voltage, respectively, for use in adjusting the collimator for the X-ray machine for which the film holder is used.

A voltage provided to the voltage transfer switch 137 from the film width to voltage converter 60 is transferred to the voltage follower 148 only if a high signal from the output of the gate 83 connected to the output of the film center comparing logic 82 is also present at the switch 137. The voltage transfer switch 147 for switching circuit 170 is similarly controlled.

The film center indication circuit 84 of FIG. 4 is shown in detail in FIG. 7 and includes the light sources provided in the handle 19 of the film holder, one for each possible length dimension for the films to be used in the film holder. Such light sources are provided by light emitting diodes (LED) 8, 10, 11, 12, 14 and 17, each of which are connected to a 12 volt D.C. source via a resistor 150. Referring to the LED 8, a path to ground (not shown) is provided by an inverter 168 when a high signal is applied to the inverter from an AND gate 178 causing LED 8 to be energized. The AND gate 178 provides a high signal at its output upon receiving a high signal from the output of the gate circuit 83, which is connected to the film center comparing logic 82 plus a high signal from the film length output conductor 48 of logic 49. The high signal on output conductor 48 indicates that a properly centered film placed in the holder has a length dimension of 8, while the high signal from gate 83 indicates the film is present and properly centered.

The remaining LED's 10, 11, 12, 14 and 17 are similarly and respectively connected to inverter circuits 170, 171, 172, 174 and 177, which in turn are under the control of separate AND circuits 180, 181, 182, 184 and 187, respectively. Each of the AND gates 180, 181, 182, 184 and 187 have one input connected to the gate circuit 83 with the respective length dimension output conductors 410, 411, 412, 414 and 417 of logic 49 providing the other input to the AND gates. Accordingly, LED's 10, 11, 12, 14 and 17 correspond to film length dimensions 10, 11, 12, 14 and 17, respectively.

Further understanding and appreciation of the invention will be obtained by considering the operation of the circuitry that has been described when a film of one of the possible sizes available is positioned properly in the film holder. Assuming a 10 × 12 size film has been placed in the holder, a high signal will appear at the output of the rectifier-filter 73 that is operatively connected to the film size sensing circuit 46 causing a high signal to be present at the width dimension output conductor 010 and the length dimension output conductor 412 of the film size decoding logic 49. In addition, since the film is considered to be properly centered, a high signal will appear at the output of differential amplifier 153 of the film center sensing circuit 81. The output of rectifier-filter 73 is applied to one input for the EXCLUSIVE OR circuit 113, while the output from differential amplifier 153 is applied to the other input. The inputs to EXCLUSIVE OR circuit 113 are then the same, causing the output of the EXCLUSIVE OR circuit 113 to be low. All of the other EXCLUSIVE OR circuits in the logic 82 will have low signals applied to their inputs so they each present a low signal at their outputs. The output of NOR circuits 117 and 118 are then high, which with the high from differential amplifier 153 applied via the diode 123 to the AND gate 119, causes the output of AND gate 127 to be high at the time a gate pulse is provided to AND gate 127 from the gate pulse circuit 48. A high signal is, therefore, presented at the output of the gate circuit 83 serving to indicate that the film in the film holder is properly centered.

The high signal that is presented at the width dimension output conductor 010 of logic 49 is applied to the voltage transfer switch 810, which is connected to the voltage presented at the connection common to resistors 132 and 133 causing the voltage transfer switch 810 to transfer such voltage to the voltage transfer switch 137 at the switching circuit 80. The voltage transfer switch 137 is operated in response to the high signal received from the gating circuit 83 to transfer the voltage applied to the voltage transfer switch 137 to the voltage follower 148 to provide a voltage at the output of the voltage follower 148 for use as the width dimension reference voltage for positioning the collimator shutters of the X-ray machine with which the film holder is used for a film having a width of 10.

Similarly, the high signal that is present at the length dimension output conductor 412 of the film size decoding logic 49 is applied to the voltage transfer switch 912 causing it to transfer the voltage present at the connection common to resistors 140 and 141 to the voltage transfer switch 147 at the switching circuit 70. The voltage transfer switch 147 is operated in response to the high signal received from the gating circuit 83 to transfer the voltage applied to the voltage transfer switch 147 to the voltage follower 149 to provide a voltage at the output of the voltage follower 149 for use as the length dimension reference voltage for positioning the collimator shutters at the X-ray machine with which the film holder is used for a film having a length of 12.

The high signal that is presented at the length dimension output conductor 412 of logic 49 is also applied to AND gate 182 of the film center indication circuit 84.

The AND gate 182 is also connected to receive the high signal output from gate 83. AND gate 182 provides a high signal to inverter 172 in response to the high signal received on output 412 plus the high signal received from gate 83. The inverter 172 in response to the high signal received from AND gate 182 provides a ground for the LED 12 causing the LED 12 to be energized thereby providing a visual indication to the operator that the film in the film holder has a length dimension of 12.

In light of the above teachings, alternative arrangements and techniques embodying the invention will be suggested to those skilled in the art. The scope of protection afforded the invention is not intended to be limited to the specific embodiments disclosed, but is to be determined only in accordance with the appended claims.

What is claimed is:

1. An improved X-ray film holder of the type for use with any one of a plurality of different predetermined film sizes, the holder having an open-topped receptacle which is closed by a top plate, and a pressure plate positioned in the receptacle wherein a vacuum when formed within the film holder draws the top plate of the holder toward the pressure plate to tightly sandwich a film positioned between the top plate and pressure plate, the improvement including
a plurality of capacitor structures, each having two plates, one plate positioned for movement with said top plate and the other positioned at said pressure plate, said capacitor structures positioned to receive or not receive a film between the plates dependent on which one of the predetermined film sizes is positioned in the film holder;
circuitry positioned within the holder and connected to said capacitor structures, said circuitry including an oscillator connected to said capacitors, a plurality of differential amplifiers connected to said capacitors for providing signals dependent on the oscillator signal passed by the capacitors as determined by the presence or absence of film at the various ones of said plurality of capacitor structures; decoding logic having a width dimension output for each possible film width dimension and a length dimension output for each possible film length dimension, said decoding logic operatively connected to said differential amplifiers and responsive thereto for providing a signal at one of said width and one of said length dimension outputs of said decoding logic corresponding to the film size presented to the holder, circuit means connected to said width dimension outputs of said decoding logic for providing a signal having a characteristic determined by the width dimension output of said decoding logic at which a signal is provided and circuit means connected to said length dimension outputs of said decoding logic for providing a signal having a characteristic determined by the length dimension output of said decoding logic at which a signal is provided.

2. An X-ray film holder of the type for use with any one of a plurality of different predetermined film sizes including
capacitive responsive means positioned within the holder having a width dimension output for each possible film width dimension and a length dimension output for each possible film length dimension, said capacitive responsive means responding to a film presented to the holder for providing a signal at the width dimension output corresponding to the width dimension of the film and a signal at the length dimension output corresponding to the length dimension of the film; and circuit means connected to said width and length dimension outputs, said circuit means providing a first signal having a characteristic determined by said width dimension output at which a signal is presented and providing a second signal having a characteristic determined by said length dimension output at which a signal is present.

3. The film holder according to claim 2 wherein said capacitive responsive means includes a plurality of capacitor structures, each having two plates movable with respect to one another for permitting the placement of film in the holder.

4. The film holder according to claim 2 wherein said capacitive responsive means includes a plurality of capacitor structures; an oscillator connected to said capacitor structures, a plurality of circuits with each connected to two of said capacitor structures, each of said circuits providing a signal when only one of said capacitor structures connected to it has film presented to it; and decoding logic providing said width and length dimension outputs, said decoding logic operatively connected to said plurality of circuits and responsive to the signals provided by said circuits for providing said signal at the width dimension output corresponding to the width dimension of the film and said signal at the length dimension output corresponding to the length dimension of the film.

5. The film holder according to claim 2 wherein said first and second signals are D.C. voltage signals and said characteristic is magnitude.

6. An X-ray film holder according to claim 2 wherein said capacitive responsive means includes a film centered output for providing a signal when a film presented to the holder is properly centered and said circuit means includes a visual indication means for each possible length dimension, each of said indication means operatively connected to said film centered output and to a different one of said length dimension outputs, each of said indication means for energization requiring a signal from the length dimension output to which it is connected coincident with said signal provided at said film centered output.

7. An X-ray film holder of the type for use with any one of a plurality of different predetermined film sizes, wherein proper use of such film requires that it be centered in the holder including a first and second set of capacitive structures positioned within the holder, each set having a plurality of capacitive structures; and circuitry including 1. an oscillator connected to said capacitive structures;
2. a first set of circuits, each connected to two of said capacitive structures in said first set;
3. a second set of circuits, each connected to two of said capacitive structures in said second set, each of said first and second sets of circuits providing a signal when only one of said capacitor structures connected to it has film presented to it;
4. a first logic circuit having a width dimension output for each possible film width dimension and a length dimension output for each possible film length dimension, said first logic circuit operatively connected to the first set of circuits and responsive thereto for providing a signal at one of said width and one of said length dimension outputs corresponding to the film size presented to the holder;
5. a second logic circuit operatively connected to said first set of circuits and to said second set of circuits for providing a signal when the film placed in the film holder is properly centered, and
6. a first and second circuit means, each connected to said second logic circuit for receiving said signal provided by said second logic circuit, said first circuit means connected to said width dimension outputs of said first logic circuit for providing a signal having a characteristic determined by the width dimension output of said first logic circuit at which a signal is provided coincident with said signal from said second logic circuit and said second circuit means connected to said length dimension outputs of said first logic circuit for providing a signal having a characteristic determined by the length dimension output of said first logic circuit at which a signal is provided coincident with said signal from said second logic circuit.

8. The film holder according to claim 7 wherein said circuitry includes a visual indication means for each possible length dimension, each of said indication means operatively connected to said second logic circuit and to a different one of said length dimension outputs for energization in response to said signal at said operatively connected length dimension output coincident with said signal provided by said second logic circuit.

9. The film holder according to claim 8 wherein said holder further includes a portion extending in a film lengthwise direction and in which said visual indication means is located for providing a position reference for each possible film length for the film sizes usable in the film holder.

10. The film holder according to claim 9 wherein said portion is a handle for said holder.

* * * * *

UNITED STATES PATENT AND TRADEMARK OFFICE
CERTIFICATE OF CORRECTION

PATENT NO. : 4,070,582
DATED : January 24, 1978
INVENTOR(S) : LEVERNE KISROW

It is certified that error appears in the above-identified patent and that said Letters Patent are hereby corrected as shown below:

Column 7, line 13, change "46" to -- 47 --.

Column 9, line 39, change "42" to --92 --.

Column 10, line 15, change "- x 14" to -- 14 x 14 --.

Column 10, line 60, change "And" to -- AND --.

Column 10, line 66, change "9" to -- 91 --

Column 11, line 60, change "17 x -" to -- 17 x 14 --.

Column 12, line 22, after "center" insert -- sensing --.

Signed and Sealed this

Eleventh Day of July 1978

[SEAL]

Attest:

RUTH C. MASON
Attesting Officer

DONALD W. BANNER
Commissioner of Patents and Trademarks